(No Model.)

G. RACE.
LINE FEEDING DEVICE.

No. 577,664. Patented Feb. 23, 1897.

WITNESSES
D. P. Moore.
May E. Moore.

INVENTOR
George Race,
by Wm N. Moore,
Attorney

UNITED STATES PATENT OFFICE.

GEORGE RACE, OF NORWICH, NEW YORK.

LINE-FEEDING DEVICE.

SPECIFICATION forming part of Letters Patent No. 577,664, dated February 23, 1897.

Application filed May 7, 1896. Serial No. 590,619. (No model.)

*To all whom it may concern:*

Be it known that I, GEORGE RACE, a citizen of the United States, residing at Norwich, in the county of Chenango and State of New York, have invented certain new and useful Improvements in Fishing-Tackle; and I do hereby declare the following to be a full, clear, and exact description of the invention, such as will enable others skilled in the art to which it appertains to make and use the same.

My invention relates to improvements in fishing-tackle, and has special reference to devices for fishing for trout or like fish of a game or sly nature.

The main object of my invention is the provision of a device which will permit the fisherman or angler to insert the pole through small openings in bushes or brush and project the line into the water without fear of being detected, and thus render it easy to fish along streams that are obstructed by bushes or thick growth.

Another object of my invention is the provision of mechanism for reeling out the line to drop the fly into the stream and of separate mechanism for winding or drawing in the line, the mechanisms being operated separately and being easy of access by the angler.

Another object of my invention is the provision of mechanism of the character and for the purpose stated which can be easily applied to the rod and which will be light, so as to add but little weight to the pole, and which will be of simple, durable, and inexpensive construction to render the improvement practical.

To attain the desired objects the invention consists of the fishing-tackle embodying novel features of construction and combination of parts, substantially as disclosed herein.

Figure 1:
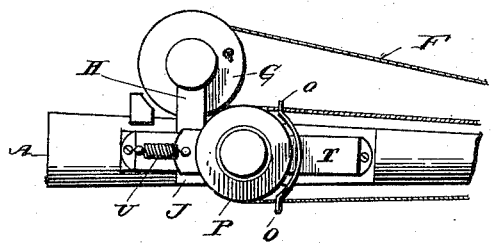
Figure 2:
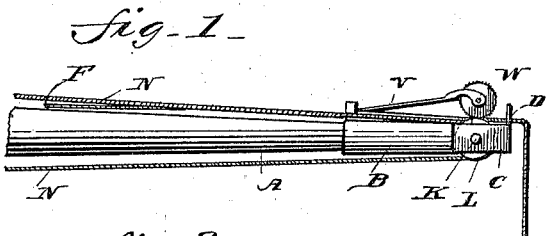
Figure 2:
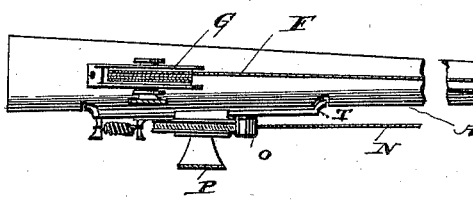
Figure 3:
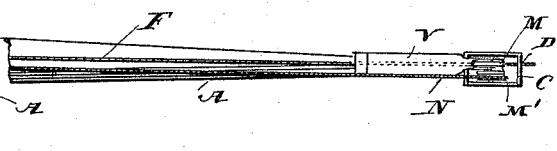
Figure 3:
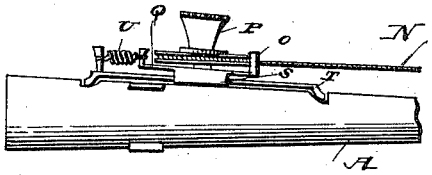
Figure 4:
Figure 4:
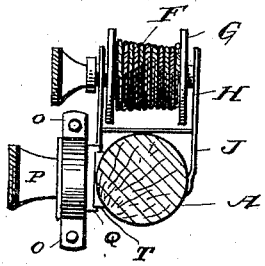
Figure 5:
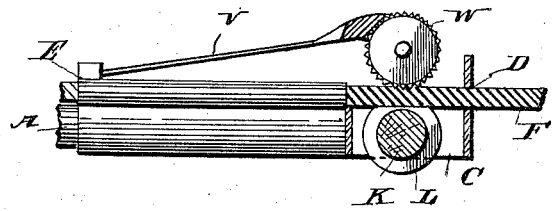

Figure 1 represents a side view of my improved fishing-tackle. Fig. 2 represents a top plan view thereof. Fig. 3 represents a bottom view, and Figs. 4 and 5 represent detail sectional views.

In the drawings, A designates a pole of any desired length and construction and to which my devices are applied. On the tip of the pole is placed the ferrule or cap B, having the open frame C, formed with the cord-guide D, and, further, provided with the supplemental sleeve or guide E, and through the guides D and E is adapted to pass the fishing or drop line F, which leads to the reel G, secured to the pole at its inner end by means of the bracket H, having the clips J. In the open frame of the ferrule or cap is mounted the shaft K, carrying the spool or drum L, having grooves M and M', the groove M receiving the fishing-line F and the groove M' receiving the line N. This line N is a continuous belt or band and passes from the groove of the spool, through guides O, to the reel P, which is mounted in the frame Q, having the said guide O and the cleats S, which fit on the guide-plate T. From this construction it will be seen that the reel has a sliding movement on the plate, and to hold it at the proper place and keep the band always taut I employ the spring U, having its ends connected to the frame Q and to the guide-plate T.

To the top of the cap or ferrule is secured the inner end of the flat spring-plate V, carrying at its outer end the toothed wheel or disk W, which bears upon the fishing-line F and holds it in intimate contact with the groove M of the spool or drum, and it will thus be seen that when the reel carrying the continuous band is rotated it rotates the grooved spool, and as a consequence thereof projects the fishing-line from the reel to drop the fly into the stream.

It will thus be seen that when it is desired to use the line for fishing through bushes or the like the ferrule is pushed through the bush above the stream and the reel is rotated to move the band and transmit rotation to the spool, which projects the fishing-line until it drops into the stream, and when the fish bites the other reel is operated to draw the line in and bring the fish directly up to the ferrule, when it can be easily landed without danger of the line becoming tangled or catching in obstructions, as is the case with ordinary tackle, and also there is no risk of being observed by the fish, all of which features are very important and render my invention very useful.

I claim—

1. In a fishing-tackle, the combination with a pole or rod, of a reel at the inner end for winding in the line, and an independent reel adjacent to the winding-reel for projecting the line.

2. In a fishing-tackle, the combination with a pole or rod, a reel at the inner end of the rod, for receiving and winding or drawing in the line, devices at the outer end of the rod for guiding the line and an independent mechanism adjacent to the winding-reel for throwing out or projecting the line.

3. In a fishing-tackle, the combination with a pole or rod, devices at the inner end of the rod for receiving and drawing in the line, guides at the outer end of the rod, for guiding and holding the line from improper movement and devices adjacent to the winding-reel for throwing out or projecting the line; said projecting devices being independent of the devices for drawing in the line.

4. In a fishing-tackle, the combination of a winding and receiving reel at the inner end of the pole, a cap or ferrule at the outer end of the pole for guiding the line, a spool or drum engaging the line and a cord or band also engaging the spool or drum to throw out or project the line.

5. In a fishing-tackle, the combination of a cap or ferrule at the end of the pole having the line-guide, the spool or drum, and the retaining or holding device, the continuous band engaging the spool, and the line passing through the guide and engaging the spool and held in engagement by means of the retaining device.

6. In a fishing-tackle, the combination of the winding and receiving reel, the cap or ferrule having the guide, the toothed wheel, and the spring for forcing said wheel down upon the line, the spool or drum mounted in the ferrule and also receiving the line, and the cord or band engaging the spool or drum for throwing out the line.

7. In a fishing-tackle, the combination of the winding and receiving reel, the cap or ferrule having the guide, the toothed wheel, and the spring for forcing said wheel down upon the line, the spool or drum mounted in the ferrule and also receiving the line, the cord or band engaging the spool or drum for throwing out the line, the reel receiving the frame carrying said cord and having a sliding movement, and a spring for holding the cord taut under all conditions.

In testimony whereof I affix my signature in presence of two witnesses.

GEORGE RACE.

Witnesses:
JOHN W. CHURCH,
NELLIE F. SMITH.